United States Patent Office 3,089,764
Patented May 14, 1963

3,089,764
BARRELLING CHIPS
Robert Jack Smith-Gorman, East Kilbride, Glasgow, Scotland, assignor to Rolls-Royce Limited, Derby, England, a company of Great Britain
No Drawing. Filed Apr. 13, 1959, Ser. No. 805,677
Claims priority, application Great Britain Apr. 17, 1958
6 Claims. (Cl. 51—308)

This invention relates to barrelling chips employed in a barrelling or tumbling process.

According to the present invention there are provided barrelling chips formed from a mixture of ball clay and china clay.

Preferably the chips are formed by mixing together dry powdered ball clay and dry powdered china clay, wetting the dry mixture so obtained, forming the wetted mixture into barrelling chips of predetermined shape, and thereafter baking said chips.

The dry mixture may be wetted with lime-free water and a wetting agent and the wetted mixture may be stirred until a substantially uniform predetermined moisture content (e.g. 15–16% by weight) is obtained throughout the wetted mixture. Preferably, the surplus liquid is removed after allowing the wetted mixture to stand for a length of time, whereafter the wetted mixture is again stirred.

Preferably the dry mixture of ball clay and china clay contains 50–60 parts by weight of $SiO_2$ to 25–35 parts by weight of $Al_2O_3$. Thus, the dry mixture of ball clay and china clay may contain 55–57 parts by weight of $SiO_2$ to 29.5–31.5 parts by weight of $Al_2O_3$.

Preferably at least 90% by weight of the dry mixture of ball clay and china clay is constituted by $SiO_2$ and $Al_2O_3$. Thus the dry mixture of ball clay and china clay may contain 61–63% by weight of $SiO_2$, 32–35% by weight of $Al_2O_3$, the balance being constituted by $TiO_2$, $Na_2O$, $Fe_2O_3$, CaO, MgO, water and impurities.

The barrelling chips preferably incorporate a separate particulate abrasive material coarser than and intermixed with the ball clay and china clay powders.

The particulate abrasive material may be, for example, emery, garnet grit, pumice, diamond dust, aluminium oxide, or any equivalent particulate granular material.

It will be appreciated that by appropriate selection of the relative proportions of the ball clay and china clay, properties such as the porosity, density, and strength of the resultant barrelling chips may be made to conform to desired standards.

Barrelling chips of the present invention, in contrast to chips of natural material, may be made of exactly predetermined shape and size and may readily be formed with appropriately rounded corners.

The invention is illustrated by the following example:

*Example*

A mixture, in dried powdered form, of ball clay and china clay was prepared having the following composition by weight:

| | |
|---|---|
| $SiO_2$ | 56.06 |
| $Al_2O_3$ | 30.33 |
| $H_2O$ | 1.28 |
| $TiO_2$ | 1.00 |
| $Na_2O$ | 0.96 |
| $Fe_2O_3$ | 0.84 |
| CaO | 0.28 |
| MgO | 0.13 |

To this dry mixture was added dry, commercial quality, abrasive aluminous oxide powder of 120 to 220 mesh size in the proportions of two parts by weight of dry aluminous oxide powder to nine parts by weight of dry clay powder.

The mixture so obtained was stirred in a powered baffle-type barrel mixer until thoroughly blended, such stirring being continued for at least half an hour. While the mixer remained in operation, a solution of lime-free water and a chemical wetting agent was introduced into the mixture. Suitable wetting agents are those marketed under the registered trademarks Lissapol and Teepol. The solution contained 99.85% by weight of lime-free water to 0.15% by weight of chemical wetting agent.

Lissapol is a non-ionic wetting agent consisting of a long chain organic polymer which contains no inorganic radicals. Its chemical name is polyethinoxyoctylcresol.

Teepol is a wetting agent which is basically a sodium salt of an alkyl sulphate.

The solution was added until the mixture was viscous and mixing was then continued in the powered baffle-type mixer for at least 40 minutes until a uniform moisture content had been achieved throughout the mass.

If a worm-driven mixer is used instead of a baffle-type, this period of mixing may be reduced from 40 to 25 minutes.

The mixture was then left to settle for 100–120 minutes after which all free solution was drained off. Sampling was conducted to find whether the solution content was 15%–16% by weight and, where this percentage was exceeded, the mixture was allowed further settling time after which the surplus solution was removed.

Upon completion of the settling period, the powered baffle-type barrel mixer was operated for a further period of at least 20 minutes to ensure uniform moisture content throughout the mass.

Barrelling chips of exactly predetermined shape and size and having appropriately rounded corners were then formed from said mixture. Having been so formed, the chips were fired at 1200–1300° C.

I claim:
1. Barrelling chips formed by firing a substantially homogeneous composition consisting of: about nine parts by weight of a fine particle mixture of ball clay and china clay, said mixture containing 50–60 parts by weight of $SiO_2$ to 25–35 parts by weight of $Al_2O_3$; and about two parts by weight of a particulate abrasive material of a mesh size in the range of 120 to 220.

2. Barrelling chips as claimed in claim 1 in which the particulate abrasive material is selected from a group consisting of emery, garnet grit, pumice, diamond dust and aluminum oxide.

3. Barrelling chips formed by firing a substantially homogeneous composition consisting only of: about nine parts by weight of a fine particle mixture of ball clay and china clay containing 55–57 parts by weight of $SiO_2$ to 29.5–31.5 parts by weight of $Al_2O_3$; and about two parts by weight of a particulate abrasive material having particles all coarser than the clay particles.

4. Process for producing barrelling chips of substantially homogeneous composition comprising, producing a dry mixture of dry powdered ball clay and dry powdered china clay, said dry mixture containing 50–60 parts by weight of $SiO_2$ to 25–35 parts by weight of $Al_2O_3$, thoroughly blending with approximately nine parts by weight of said dry mixture approximately two parts by weight of a dry particulate abrasive material having particles coarser than the clay powder, wetting the blended mixture with more than 16% of its weight of water, stirring the wetted mixture for a period approximating one-half hour to achieve a uniform moisture content throughout, moulding the wetted mixture into barrelling chips of desired shape and baking said chips at a temperature of about 1200°.

5. The process as claimed in claim 4 in which the wetted mixture is allowed to settle for approximately two hours and free water removed until the moisture content is approximately 15% by weight, and the remaining mixture again stirred for at least twenty minutes before moulding and baking.

6. Process for producing barrelling chips of substantially homogeneous composition comprising, producing a dry mixture of dry powdered ball clay and dry powdered china clay, said mixture containing 61% to 63% by weight of $SiO_2$, 32% to 35% by weight of $Al_2O_3$, the balance consisting of $TiO_2$, $Na_2O$, $Fe_2O_3$, CaO, MgO, water and impurities, thoroughly blending with about nine parts of said dry mixture, about two parts by weight of a dry particulate abrasive material having particles coarser than the clay powder, wetting and stirring the blended mixture with water until the wetted mixture has a substantially uniform moisture content to the order of 15% by weight, forming the resulting mixture in uniform chips and thereafter baking said chips at a temperature of about 1300° C.

References Cited in the file of this patent

UNITED STATES PATENTS

| | | |
|---|---|---|
| 1,546,115 | Beecher et al. | July 14, 1925 |
| 1,567,091 | Tone | Dec. 29, 1925 |
| 2,877,103 | Lane | Mar. 10, 1959 |

FOREIGN PATENTS

| | | |
|---|---|---|
| 255,607 | Great Britain | July 29, 1926 |
| 302,519 | Great Britain | Dec. 20, 1928 |
| 575,237 | Great Britain | Feb. 8, 1946 |